April 4, 1961

R. L. HUXTABLE 2,978,542

IMPEDANCE-MATCHING NETWORK

Filed May 22, 1958

INVENTOR
R. L. HUXTABLE
BY
Ralph T. Holcomb
ATTORNEY 2,978,542

IMPEDANCE-MATCHING NETWORK

Ruth L. Huxtable, Yonkers, N.Y., assignor to American Telephone and Telegraph Company, a corporation of New York Filed May 22, 1958, Ser. No. 737,159

9 Claims. (Cl. 178—45)

This invention relates to wave transmission circuits and more particularly to an impedance-matching network for building out the impedance of an inductively loaded transmission line.

An object of the invention is to build out the image impedance of an inductively loaded transmission line to a more desirable value. Another object is to reduce reflection effects between such a line and apparatus connected thereto. A more specific object is to match such a line to an associated amplifier over the band of the amplifier when this band extends above the cut-off of the line.

A transmission line often requires an amplifier to reduce the loss. A good impedance match between the amplifier and the line over the band of the amplifier is necessary to avoid singing. The present invention provides a network for insertion between an inductively loaded transmission line and an associated wide-band amplifier to simplify this impedance matching. The image impedance of such a line at midsection has a resistive component and a reactive component each of which rises to fairly high values at low frequencies and also around the cut-off. The transmission band of the amplifier may extend well above the cut-off of the line. The network is adapted to build out the midsection impedance of the line to an approximately pure resistance over the band of the amplifier, including the portion lying above the cut-off of the line. This greatly simplifies the design of an amplifier having a matching impedance characteristic.

An impedance-matching network in accordance with the invention, adapted to build out an inductively loaded line terminated at midsection, comprises a series impedance branch and one or more shunt branches. The series branch includes an inductor shunted by the series combination of a resistor and a capacitor. Each shunt branch includes a resistor and a capacitor in series, and one may include an inductor. The values of these component elements depend upon the inductance and capacitance per section of the line.

The nature of the invention and its various objects, features, and advantages will appear more fully in the following detailed description of a typical embodiment illustrated in the accompanying drawing, of which:

Figure 1:
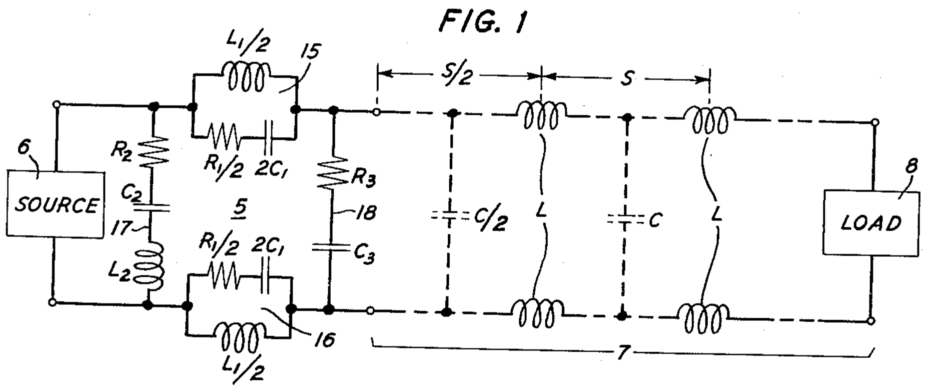
Fig. 1 is a schematic circuit of an impedance-matching network in accordance with the invention associated with an inductively loaded line.

In Fig. 1, the impedance-matching network 5 is inserted between a signal source 6 and a transmission line 7 terminated in a matching load impedance 8. The source 6 may be an amplifier, which may be of the negative-impedance type. The line 7 is periodically loaded with coils of inductance L having a spacing S. The line has distributed capacitance C per section.

Figure 2:
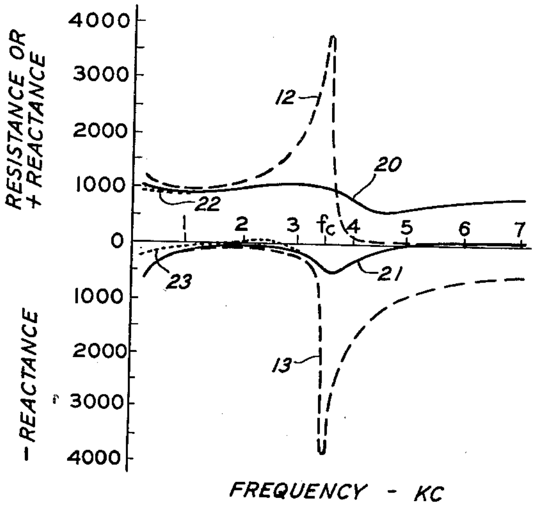
Fig. 2 shows comparative impedance-frequency characteristics of the line and the built-out line.

Fig. 2 shows a typical midsection image impedance characteristic of the line 7 when the conductors are a cable pair of 22-gauge copper, S is 6000 feet, each loading coil has an inductance L of 0.088 henry, and C is 0.0936 microfarad. The line has a cut-off frequency $f_c$ of 3.5 kilocycles. The broken-line curves 12 and 13 represent, respectively, the resistance and the reactance in ohms. The reactance is negative over the entire range shown and does not exceed 200 ohms over most of the voice range. The resistance is about 1000 ohms at one kilocycle. However, at the cut-off frequency, each of these curves rises rather steeply to more than 3500 ohms.

It is assumed that the amplifier 6 has a pass band considerably wider than the band of the line 7 and may, for example, extend from 0.3 to 7 kilocycles. In order to prevent singing, the impedance of the amplifier 6 must match that of the line 7 over substantially the entire band of the amplifier. It is, however, difficult and expensive to design an amplifier which will present to the line a complex impedance of the type shown by the curves 12 and 13.

To make this matching easier, line 7 is built out by means of the impedance-matching network 5 inserted between the line and the amplifier 6. The network 5 comprises two equal series impedance branches 15 and 16 and one or more shunt branches such as 17 and 18, connected one on each side of the series branches. Each series branch includes an inductor of value $L_1/2$ shunted by the series combination of a resistor of value $R_1/2$ and a capacitor of value $2C_1$. If an unbalanced structure is permissible, the series branch 16 may be omitted and the impedance of each of the component elements in the other branch 15 doubled. The shunt branch 17 on the drop side includes a resistor of value $R_2$, a capacitor of value $C_2$, and an inductor of value $L_2$ in series. The branch 18 on the line side comprises the series combination of a resistor of value $R_3$ and a capacitor of value $C_3$. The values of these elements are chosen with respect to the inductance and the capacitance per section of the line 7 to build out the impedance to a characteristic which is more easily matched by the amplifier 6.

It will be assumed that the amplifier 6 has a nonreactive output impedance $R_A$ of 900 ohms throughout its band from 0.3 to 7 kilocycles. The objective, then, is to choose the values of the component elements so that the network 5 will build out the line impedance as nearly as possible to a pure resistance of 900 ohms over this band. The principal correction is accomplished by the series branches 15 and 16. The shunt branches 17 and 18 provide, respectively, low-frequency and high-frequency correction.

In the branch 18, $C_3$ is chosen to build out the line 7 to approximately 0.8 section. Since the line is assumed to be terminated at 0.5 section, $$C_3 \doteq 0.3C \qquad (1)$$

In the present example, C is 0.0936 and $C_3$ is chosen as 0.03 microfarad. The value of $R_3$ is approximately equal to the minimum midsection image impedance of the line in the transmission band. In this example, the line has a minimum impedance of 1035—j177 at 1 kilocycle and $R_3$ is chosen as 1000 ohms. With these values, the branch 18 makes the resistance of the built-out line considerably more constant, especially in the upper half of the transmission band of the line, and reduces the reactance above the cut-off.

The desired function of the series branches 15 and 16 is to add resistance only above the cut-off of the line and to add positive reactance having a maximum near the cut-off of the line or somewhat above. The combination of inductance, resistance and capacitance shown has this type of characteristic when the elements are properly chosen. The value of the inductance $L_1$ is related to the loading inductance L and is founded approximately from the relationship $$L_1 \doteq L/4 \qquad (2)$$

In the present example, $L_1$ is 0.022 henry. The reactance of the capacitance $C_1$ is made equal in magnitude to the reactance of the inductance $L_1$ at a frequency $f_1$ somewhat above the cut-off $f_c$ and therefore $$C_1 = 1/(2\pi f_1)^2 L_1 \qquad (3)$$

In the example, $f_1$ is 4.5 kilocycles and $C_1$ is 0.057 microfarad. The resistance $R_1$ is somewhat less than the resistance $R_A$ to be matched, here assumed to be 900 ohms, and is selected to make the resistive component of the built-out impedance of the line as nearly uniform as possible over the band of interest. After a few trials, $R_1$ was chosen as 874 ohms. This combination has a resistance of less than 10 ohms below 1.5 kilocycles but gradually increases to 806 ohms at 8 kilocycles. The reactance reaches a maximum of 620 ohms at $f_1$ and then decreases.

When the shunt branch 18 and the series branches 15 and 16 are added, the built-out impedance becomes as shown by the solid-line curves 20 and 21 in Fig. 2. Curve 20 represents the resistance and 21 the reactance. The resistance does not differ from the desired 900 ohms by more than +200 or −250 over the amplifier band between 0.3 and 7 kilocycles. The maximum reactance in this range is less than 500 ohms.

It will be noted that the curves 20 and 21 increase in value at the low-frequency end. This may be corrected, if required, by adding the shunt branch 17. When $R_2$ is 3600 ohms, $C_2$ is 0.25 microfarad, and $L_2$ is 2 henries, both the resistance and the reactance of the built-out line impedance are lowered and straightened at low frequency. This improvement is shown by the dotted curves 22 and 23, which merge, respectively, with the curves 20 and 21 at higher frequencies.

Figure 3:
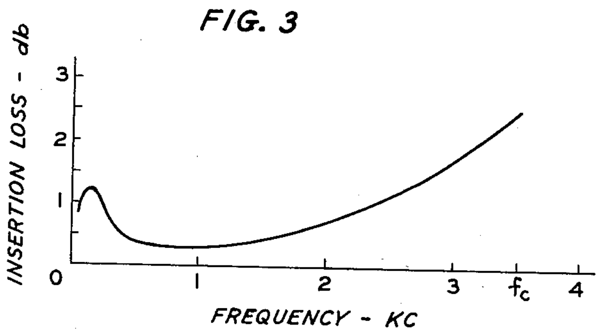
Fig. 3 shows the insertion loss characteristic of the network.

The insertion loss of the network 5, shown in Fig. 3, does not exceed 2.5 decibels in the transmission band of the line 7 and is fairly uniform over most of this region.

It is to be understood that the above-described arrangement is only illustrative of the application of the principles of the invention. Numerous other arrangements may be devised by those skilled in the art without departing from the spirit and scope of the invention.

What is claimed is:

1. In combination, an inductively loaded transmission line, a negative-impedance amplifier connected in tandem therewith, and an impedance-matching network inserted between the line and the amplifier, the amplifier having a pass band extending above the cut-off of the line, the network including series impedance equivalent to a branch comprising an inductor shunted by the series combination of a resistor and a capacitor, the inductor having an inductance equal to a fractional part of the inductance of the line per section, the capacitor having a reactance equal in magnitude to the reactance of the inductor at a frequency above the cut-off of the line, and the resistor having a resistance chosen to make the impedance looking into the network from the amplifier approximately a pure resistance throughout substantially the entire pass band of the amplifier.

2. In combination, a loaded transmission line terminated at approximately midsection at one end and an impedance-matching network connected to the one end thereof, the line including periodically spaced loading coils each of inductance L and having distributed capacitance C per section, the network comprising series impedance and a shunt impedance at the line end of the series impedance, the shunt impedance including a capacitor having a capacitance approximately equal to 0.3C and the series impedance being equivalent to a branch including an inductance $L_1$ shunted by the series combination of a resistance $R_1$ and a capacitance $C_1$, where $L_1$ is approximately equal to $L/4$, $C_1$ is approximately equal to $1/(2\pi f_1)^2 L_1$, $f_1$ is a frequency above the cut-off of the line, and $R_1$ is chosen to make the resistive component of the built-out impedance of the line as nearly uniform as possible over a band of frequencies including the major portion of the transmission band of the line and extending well above the cut-off.

3. The combination in accordance with claim 2 in which the network includes a second shunt impedance at the other end of the series impedance adapted to make the built-out impedance more nearly a constant, pure resistance at low frequencies, the second shunt branch including a resistor, a capacitor, and an inductor connected in series.

4. The combination in accordance with claim 2 in which the shunt impedance includes a resistance approximately equal to the minimum midsection image impedance of the line in the transmission band thereof.

5. An impedance-matching network adapted for connection to an inductively loaded transmission line terminated in a fractional section to build out the impedance of the line to an approximately constant, pure resistance $R_A$ over a wide band of frequencies extending above and below the cut-off of the line, the network comprising two shunt impedance branches and interposed series impedance, the shunt branch at the line end of the network including a capacitor of proper value to build out the line to approximately 0.8 section, the series impedance being equivalent to a branch comprising an inductor $L_1$ shunted by a resistor $R_1$ and a capacitor $C_1$ in series, $L_1$ having a value approximately equal to one-fourth of the inductance of the line per section, $C_1$ having a reactance equal in magnitude to the reactance of $L_1$ at a frequency above the cut-off of the line, and $R_1$ having a value somewhat less than $R_A$, and the other shunt branch including the series combination of a resistor, a capacitor, and an inductor whose values are chosen to lower and straighten the resistance and the reactance of the built-out line impedance at low frequencies.

6. A network in accordance with claim 5 in which the shunt branch at the line end of the network includes a series resistor having a value approximately equal to the minimum midsection image impedance of the line in the transmission band.

7. In combination, an inductively loaded transmission line terminated at one end in a fractional section and an impedance-matching network connected to the one end of the line, the network comprising series impedance and a shunt impedance branch at the line end of the network, the series impedance being equivalent to that of a branch including an inductor of value $L_1$ shunted by the series combination of a resistor of value $R_1$ and a capacitor of value $C_1$ and the shunt branch including a resistor of value $R_3$ and a capacitor of value $C_3$ connected in series, where $C_3$ is equal to a fractional part of the distributed capacitance of the line per section, $R_3$ is approximately equal to the minimum midsection image impedance of the line in the transmission band, $L_1$ is equal to a fractional part of the inductance of the line per section, $C_1$ has a reactance equal in magnitude to the reactance of $L_1$ at a frequency above the cut-off of the line, and $R_1$ is selected to make the resistive component of the built-out impedance of the line as nearly uniform as possible over a band of frequencies including a major portion of the transmission band of the line and extending above the cut-off.

8. In combination, a loaded transmission line and an impedance-matching network connected in tandem, the network comprising series impedance and a shunt impedance branch, the series impedance being equivalent to a branch including a first inductor in parallel with the series combination of a first capacitor and a first resistor and the shunt branch including the series combination of a second inductor, a second capacitor, and a second resistor, where the first inductor has an inductance equal to a fractional part of the inductance of the line per section, the first capacitor has a reactance equal in magnitude to the reactance of the first inductor at a frequency above the cut-off of the line, the first resistor has a resistance selected to make the resistive component of the built-out impedance of the line as nearly uniform as possible over a band of frequencies including a major portion of the transmission band of the line and extending above the cut-off, and the shunt branch is adapted to make the built-out impedance more nearly a constant, pure resistance at low frequencies.

9. In combination, an inductively loaded transmission line terminated at one end in a fractional section and an impedance-matching network connected to the one end of the line, the network comprising two shunt impedance branches and interposed series impedance, the series impedance being equivalent to a branch including an inductor of value $L_1$ shunted by the series combination of a capacitor of value $C_1$ and a resistor of value $R_1$, the shunt branch at the line end of the network including a capacitor of value $C_3$ and a resistor of value $R_3$ connected in series and the other shunt branch including a resistor, a capacitor and an inductor connected in series, where $L_1$ is equal to a fractional part of the inductance of the line per section, $C_1$ has a reactance equal in magnitude to the reactance of $L_1$ at a frequency above the cut-off of the line, $R_1$ is chosen to make the resistive component of the built-out impedance of the line as nearly uniform as possible over a band of frequencies including a major portion of the transmission band of the line and extending above the cut-off, $C_3$ is equal to a fractional part of the distributed capacitance of the line per section, $R_3$ is approximately equal to the minimum midsection image impedance of the line in the transmission band, and the other shunt branch is adapted to lower and straighten the resistance and the reactance of the built-out impedance at low frequencies.

References Cited in the file of this patent

UNITED STATES PATENTS 2,629,819 Dome et al. ------------- Feb. 24, 1953